United States Patent
Roca et al.

(10) Patent No.: US 12,462,259 B2
(45) Date of Patent: Nov. 4, 2025

(54) PRIVATE LABEL ACCOUNT NUMBER PROTECTION

(71) Applicant: BREAD FINANCIAL PAYMENTS, INC., Columbus, OH (US)

(72) Inventors: Arthur Roca, Columbus, OH (US); Randall Piatt, Blacklick, OH (US); Tom Pugh, Powell, OH (US); Rachit Sood, Columbus, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 72 days.

(21) Appl. No.: 15/795,164

(22) Filed: Oct. 26, 2017

(65) Prior Publication Data
US 2019/0005498 A1    Jan. 3, 2019

Related U.S. Application Data

(60) Provisional application No. 62/526,936, filed on Jun. 29, 2017.

(51) Int. Cl.
*G06Q 20/08*    (2012.01)
*G06Q 20/10*    (2012.01)
*G06Q 20/38*    (2012.01)
*G06Q 20/40*    (2012.01)

(52) U.S. Cl.
CPC ....... *G06Q 20/409* (2013.01); *G06Q 20/3825* (2013.01); *G06Q 20/385* (2013.01)

(58) Field of Classification Search
CPC ............................................. G06Q 20/00–425
See application file for complete search history.

(56) References Cited

U.S. PATENT DOCUMENTS

| | | | | |
|---|---|---|---|---|
| 4,320,260 A | * | 3/1982 | Lechner | H04M 19/026 |
| | | | | 379/27.08 |
| 6,502,747 B1 | * | 1/2003 | Stoutenburg | G06Q 20/00 |
| | | | | 235/379 |
| 7,861,930 B2 | | 1/2011 | Esplin et al. | |
| 8,060,413 B2 | | 11/2011 | Castell et al. | |
| 8,682,802 B1 | | 3/2014 | Kannanari | |
| 9,195,984 B1 | * | 11/2015 | Spector | G06Q 20/367 |
| 9,342,832 B2 | * | 5/2016 | Basu | G06Q 20/02 |
| 9,524,501 B2 | | 12/2016 | Weber | |
| 10,176,478 B2 | * | 1/2019 | Griggs | G06Q 40/00 |
| 10,318,932 B2 | * | 6/2019 | Bower | G06Q 20/20 |

(Continued)

OTHER PUBLICATIONS

Ron White, How Computers Work, Oct. 2003, QUE, Seventh Edition (Year: 2003).*

(Continued)

*Primary Examiner* — Chenyuh Kuo (57) ABSTRACT

A system and method for private label account number protection is described. A method receives, at a retail computing system, a private label credit account number being proffered to make a private label credit purchase. A request for authorization for the purchase is provided from the retail computing system to a private label credit account provider over a dedicated connection between the retail computing system and the private label credit account provider. The retail computing system receives an authorization token from the credit account provider and stores the authorization token in place of the private label credit account number.

11 Claims, 4 Drawing Sheets

(56) References Cited

U.S. PATENT DOCUMENTS

| | | | |
|---|---|---|---|
| 10,713,660 B2* | 7/2020 | Awasthi | H04L 63/10 |
| 11,120,430 B2* | 9/2021 | Metral | G06Q 20/3226 |
| 11,257,076 B2* | 2/2022 | Gulak | G06Q 20/3829 |
| 2008/0114699 A1 | 5/2008 | Yuan et al. | |
| 2009/0233579 A1 | 9/2009 | Castell et al. | |
| 2010/0153221 A1 | 6/2010 | Esplin et al. | |
| 2011/0161233 A1* | 6/2011 | Tieken | G06Q 20/40 705/76 |
| 2012/0101881 A1* | 4/2012 | Taylor | G06Q 20/00 235/379 |
| 2012/0150669 A1 | 6/2012 | Langley et al. | |
| 2013/0031006 A1 | 1/2013 | McCullagh et al. | |
| 2013/0198080 A1 | 8/2013 | Anderson et al. | |
| 2014/0143075 A1 | 5/2014 | Eason, Jr. et al. | |
| 2015/0112870 A1* | 4/2015 | Nagasundaram | H04M 1/24 379/27.01 |
| 2015/0112871 A1 | 4/2015 | Kumnick | |
| 2015/0254648 A1 | 9/2015 | Clements et al. | |
| 2015/0254698 A1 | 9/2015 | Bondesen et al. | |
| 2015/0254699 A1 | 9/2015 | Bondesen et al. | |
| 2015/0278799 A1 | 10/2015 | Palanisamy | |
| 2016/0034900 A1* | 2/2016 | Nelsen | G06Q 20/3224 705/44 |
| 2016/0162884 A1 | 6/2016 | Bondesen et al. | |
| 2016/0253651 A1 | 9/2016 | Park et al. | |
| 2016/0275474 A1 | 9/2016 | Kim et al. | |
| 2016/0335641 A1 | 11/2016 | White et al. | |
| 2017/0293916 A1* | 10/2017 | Humphrys | G06Q 20/10 |
| 2018/0255142 A1* | 9/2018 | Benantar | H04L 41/0806 |
| 2020/0034837 A1* | 1/2020 | Narayan | G06Q 20/38215 |

OTHER PUBLICATIONS

Mian et al., Enhancing Communication Adaptability Between Payment Card Processing Networks, IEEE Communications Magazine, Mar. 2015 (Year: 2015).*

* cited by examiner

```
┌─────────────────────────────────────────────────────────────┐
│ RECEIVES, AT A RETAIL COMPUTING SYSTEM, A PRIVATE LABEL     │
│ CREDIT ACCOUNT NUMBER BEING PROFFERED TO MAKE A             │
│ PRIVATE LABEL CREDIT PURCHASE                               │
│ 210                                                         │
└─────────────────────────────────────────────────────────────┘
                              │
                              ▼
┌─────────────────────────────────────────────────────────────┐
│ PROVIDES, FROM THE RETAIL COMPUTING SYSTEM AND TO A         │
│ PRIVATE LABEL CREDIT ACCOUNT PROVIDER, A REQUEST FOR        │
│ AUTHORIZATION FOR THE PURCHASE, THE REQUEST FOR             │
│ AUTHORIZATION BEING PROVIDED OVER A DEDICATED               │
│ CONNECTION BETWEEN THE RETAIL COMPUTING SYSTEM AND          │
│ THE PRIVATE LABEL CREDIT ACCOUNT PROVIDER                   │
│ 220                                                         │
└─────────────────────────────────────────────────────────────┘
                              │
                              ▼
┌─────────────────────────────────────────────────────────────┐
│ RECEIVES, AT THE RETAIL COMPUTING SYSTEM AND FROM THE       │
│ CREDIT ACCOUNT PROVIDER, AN AUTHORIZATION TOKEN             │
│ 230                                                         │
└─────────────────────────────────────────────────────────────┘
                              │
                              ▼
┌─────────────────────────────────────────────────────────────┐
│ STORES, AT THE RETAIL COMPUTING SYSTEM, THE                 │
│ AUTHORIZATION TOKEN IN PLACE OF THE PRIVATE LABEL           │
│ CREDIT ACCOUNT NUMBER                                       │
│ 240                                                         │
└─────────────────────────────────────────────────────────────┘
```

FIG. 4

PRIVATE LABEL ACCOUNT NUMBER PROTECTION

CROSS-REFERENCE

This application claims priority to and benefit of U.S. Provisional Patent Application No. 62/526,936 Filed on Jun. 29, 2017, entitled "PRIVATE LABEL ACCOUNT NUMBER PROTECTION" by Arthur Roca, and assigned to the assignee of the present application, the disclosure of which is hereby incorporated by reference in its entirety.

BACKGROUND

Presently, when a purchase is made by a consumer, it is common for the retailer to retain a copy of the account number for later returns, customer rewards, etc. However, a data breach of the retailer's computer can result in the stored account numbers being obtained and then exploited for unauthorized purposes.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

A system and method of protecting a consumer's private label card number at a retailer database is discussed herein. In general, when a credit purchase is processed the retailer will contact the private label credit account company or its agent's computing system having at least a processor and a database (hereinafter private label credit account provider computing system for authorization to accept the purchase. In one embodiment, the private label credit account provider computing system will generate an authorization token which is similar to a bank identification number (BIN), issuer identification number (IIN), or the like, but will not include the private label credit account number.

In so doing, the private label credit account number will be protected from theft or loss at the retailer database. In other words, a data breach (or hack) of the merchant environment will not result in the actual credit account information being stolen.

A brand specific credit account refers to a credit account that is available for use only at locations related to the brand. E.g., Tim's store has a brand specific credit account that allows Celeste, a Tim's store customer, to purchase with credit at Tim's store using Tim's brand specific credit account. However, Celeste cannot use the Tim's brand specific credit account to make purchases at her local gas station. A brand specific credit account may also be referred to as a private label card, e.g., a card that can be used for purchases only at the store on the label.

A co-branded card refers to a card that has a store on the label as well as an underlying credit card network with an accompanying logo (e.g., Visa™, Mastercard™, etc.). As such, a co-branded card may be used for purchases at the store on the label as well as at other stores that accept that credit card network's credit cards.

Importantly, the embodiments of the present invention, as will be described below, provide an approach for private label card number protection in the retail environment which differs significantly from the conventional processes. In conventional approaches, when a purchase is authorized the account number is stored at the retailer database. Here, the present embodiments, as will be described and explained below in detail, provide a previously unknown procedure to identify the transaction throughout the purchase life cycle, e.g., from authorization, through settlement all the way to billing using a token. Moreover, the present embodiments allow the private label credit account provider computing system and/or retailer computing system to maintain a running tally of purchase information for a specific credit account by linking the tokens to the credit account at the credit provider database. Thus, embodiments of the present invention provide an approach for tracking authorized purchases and customer earned rewards and offers which extends well beyond what was previously done by hand.

As will be described in detail, the various embodiments of the present invention do not merely implement conventional monitoring of processes on a computer. Instead, the various embodiments of the present invention, in part, provide a previously unknown procedure to protect the credit account number throughout the purchase life cycle, e.g., from authorization, and purchase all the way to returns, refunds, warranties, and rewards earnings. Moreover, the present embodiments provide real-time security for the private label credit account provider computing system and/or retailer computing system in the case of a retailer data breach. Hence, embodiments of the present invention provide a novel process for tracking authorized purchases which is necessarily rooted in computer technology to overcome a problem specifically arising in the realm of retailer data breach.

Moreover, the embodiments do not recite a mathematical algorithm; nor do they recite a fundamental economic or longstanding commercial practice. Instead, they address a business challenge of accurately and timely authorizing purchases for the private label credit account provider computing system and retailer computing system while maintaining credit account number security and ensuring customer loyalty, rewards and purchases are linked and trackable. Thus, the embodiments do not merely recite the performance of some business practice known from the pre-Internet world along with the requirement to perform it on the Internet. Instead, the embodiments are necessarily rooted in retail technology in order to overcome a problem specifically arising in the realm of a data breach (or hack) of the merchant environment.

Operation

Figure 1:
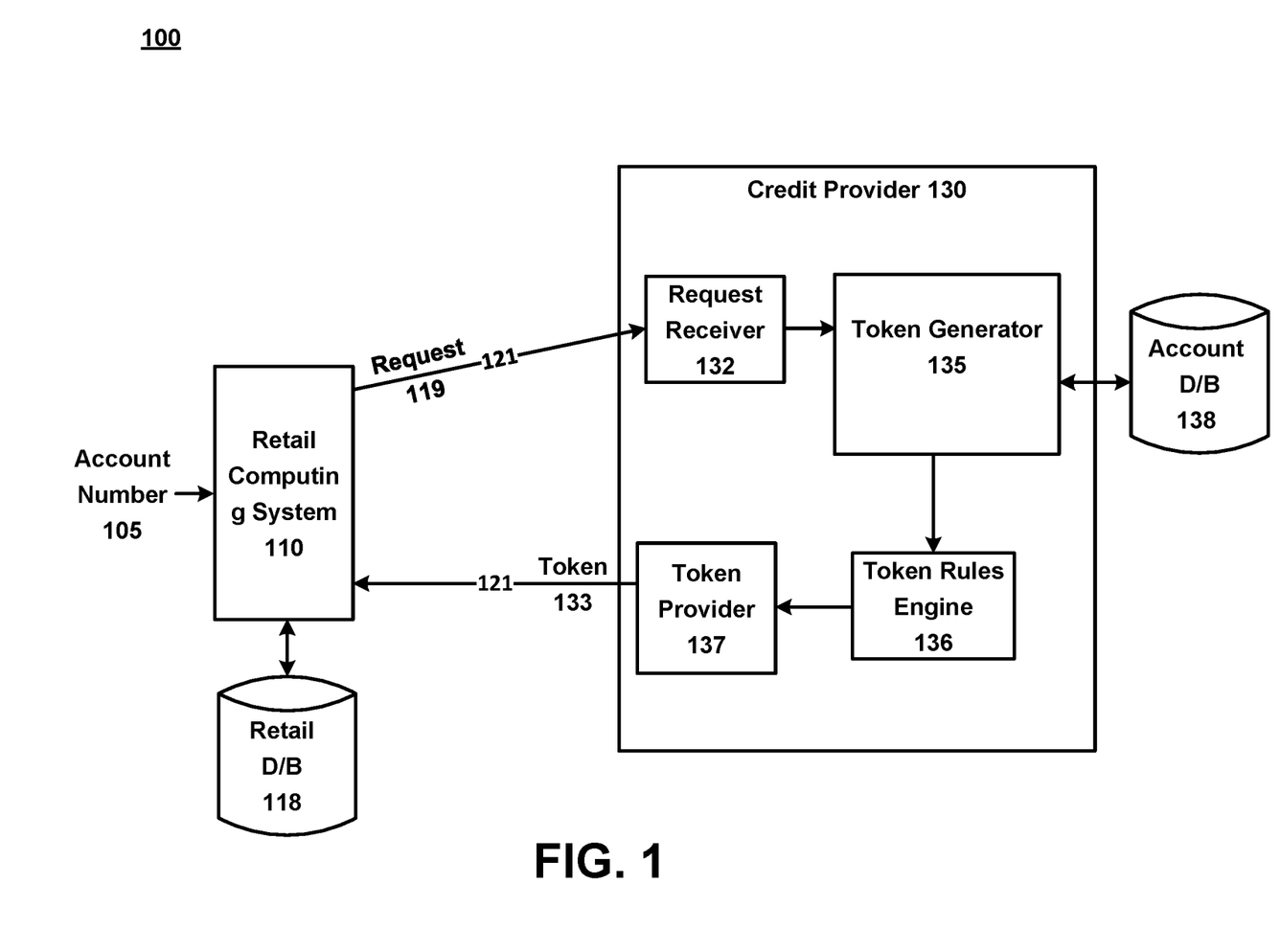
FIG. 1 is a block diagram of a system to protect a consumer's private label card number at a retailer database, in accordance with an embodiment.

Referring now to FIG. 1, a block diagram of a system 100 to protect a consumer's private label card number at a retailer database 118 is shown in accordance with an embodiment. FIG. 1 includes a private label credit account number 105, a retail computing system 110, and a private label credit account provider computing system 130 the private label credit account provider computing system having at least a processor and a database (e.g., such as account database 138).

In one embodiment, private label credit account number 105 is provided to the retail computing system 110 by a customer in a retail environment planning on making a purchase with a credit account. For example, private label credit account number 105 may be provided by a customer at the time of purchase. In general, private label credit account number 105 is provided via a card swipe, a mobile device payment method at a point of sale (POS), via e-commerce (such as an Internet purchase, etc.), and the like. In general, a mobile device refers to a user's personal device, such as but not limited to a mobile phone, smart jewelry, cell phone, tablet, notebook, or other electronic device with wired or wireless internet connectivity capable of performing one or more steps in a mobile payment process. In general, the mobile device will perform the mobile purchasing process or will have an application operating thereon that will perform the mobile purchasing process.

In one embodiment, retail computing system 110 includes a retail sales device such as a cash register at the POS, an employee held tablet, or the like with wired or wireless internet connectivity. Retail computing system 110 also includes a retailer database 118 which is used to store customer purchase information, rewards information, and the like.

In one embodiment, retail computing system 110 will provide identifying aspects 119 about the purchase to private label credit account provider computing system 130. The identifying aspects 119 will include, but is not limited to, a request for authorization and the private label credit account number 105.

In one embodiment, identifying aspects 119 will also include details about the goods purchased. For example, in one embodiment, identifying aspects 119 will include information about the purchase such as, type of payment (e.g., mobile), client identifier (e.g., mobile device identifier, account number, SSN, or the like), Store identifier (e.g., Store #, register #, clerk name/number, etc.), purchase amount, description of the goods purchased (e.g., manufacturer, make, model, color, size, etc.) and other aspects. In general, the different identifying aspects that are provided may be pre-set, retailer configurable, private label account provider configurable, or a combination thereof.

Retail computing system 110 will communicate with private label credit account provider computing system 130 via a direct communication connection 121 between retail computing system 110 and private label credit account provider computing system 130. In one embodiment, direct communication connection 121 causes communications to be directly transmitted between the retail computing system 110 and the private label credit account provider computing system 130. In one embodiment, direct communication connection 121 is the communication connection used for all communication between retail computing system 110 and private label credit account provider computing system 130.

Private label credit account provider computing system 130 is the agent of the private credit account being used and provides authorization for payment to retail computing system 110 before the purchase can be completed at retail computing system 110.

In one embodiment, private label credit account provider computing system 130 will receive the purchase request including identifying aspects 119 at request receiver 132. Request receiver 132 will pass the request to token generator 135 which will generate authorization token 133.

In one embodiment, token generator 135 includes token rules engine 136. Although token rules engine 136 is shown as distinct from token generator 135, it should be appreciated that the token rules engine 136 may be a part of token generator 135. For example, token rules engine 136 may be a remote system or database that is accessed by token generator 135 similar to that of account database 138.

Token generator 135 will include, in one embodiment, a token scope. The token scope allows for limiting the use of the authorization token. For example, the authorization token with a broad scope would be available for use on any number of channels, devices and the like. In contrast, a limited scope would restrict the token usage to specific channels, devices or the like. In general, channels refer to web, mobile, etc.; and devices refers to phones, computers, watches, smart jewelry, etc. Allowing different limitations to be integrated as part of the token scope, will further limit the use of the authorization token to help prevent fraud. For example, if a token has a scope that limits it use to a mobile channel and a smart watch device the token would be narrow in scope.

Token rules engine 136 is used to ensure that the scope of the token being generated matches the scope defined by the authorization request. For example, if the authorization request is for a token with a narrow scope that authorizes a mobile purchase over near field communication (NFC), then the token scope of the authorization token 133 should identify mobile device and NFC when it is checked by token rules engine 136. In one embodiment, if the scope does not match, the request will be declined. Similarly, if the authorization request is for a token with a broad scope, the token rules engine 136 will check the generated authorization token 133 to ensure that the scope is not unduly narrowed. In yet another embodiment, if the authorization request is for a token with a broad scope, the token rules engine 136 will check the generated authorization token 133 to ensure that the scope is not unduly broad. For example, the token rules engine 136 may have a number of different rules provided for fraud prevention that are applied even to authorization tokens that are broad based on the authorization request. In one embodiment, the rules used by token rules engine 136 can be different per client, per customer, per purchase amount, and the like.

In addition, token generator 135 will link authorization token 133 with the private label credit account associated with private label credit account number 105 at the account database 138. Moreover, any number of authorization tokens 133 may be linked with a single private label credit account on the database 138.

Because the authorization token(s) 133 are linked with the underlying private label credit account, the private label credit account provider computing system 130 will be able to tally a plurality of metrics for every authorization token 133 linked with the private label credit account and utilize the tally to calculate different metrics. For example, the metrics may include, rewards information for the private label credit account, customer loyalty, spending trends, offers, incentives, coupons, and the like. By maintaining the tallies for the different authorization token(s) 133 associated with the underlying private label credit account, the private label credit account provider computing system 130 can ensure that the customer receives all earned rewards, benefits, etc.

Token generator 135 will provide authorization token 133 to authorization token provider 137 which will transmit authorization token 133 directly to retail computing system 110 via direct communication connection 121.

For example, during a transaction, the customer provides the private label account number to the retail computing system 110, the transaction is transmitted directly to the private label credit account provider computing system 130 (e.g., Alliance Data) over the direct communication connection 121. When the private label credit account provider computing system 130 approves the sale, instead of returning the account number and the approval code to the retail computing system 110, an authorization token is provided, via the direct communication connection 121 the retail computing system 110, instead. The token resembles the credit card structure so that it is usable, but does not include the credit account number. The retailer computing system 110 will store the authorization token 133 in their system (e.g., retailer database 118), in place of the credit account number, for purposes of returns, loyalty rewards, etc.

Thus, the authorization token 133 is provided by private label credit account provider computing system 130 at the time of the sale and replaces private label credit account number 105 when the purchase information is stored at retailer database 118. Moreover, authorization token 133 seamlessly replaces private label credit account number 105 without need to modify or upgrade retail computing system 110.

In one embodiment, in addition to being a replacement for the private label credit account number 105 to be stored at retailer database 118, authorization token 133 will include some or all of the information about the purchase such as, a client identifier (e.g., mobile device identifier, account number, SSN, or the like), a store identifier (e.g., Store #, register #, clerk name/number, etc.), a purchase amount, a description of the goods purchased (e.g., manufacturer, make, model, color, size, etc.) and other aspects. In general, the different identifying aspects 119 may be preset, user configurable or a combination thereof. An example of the authorization token 133 is described in more detail in the discussion of FIG. 3.

Figure 2:
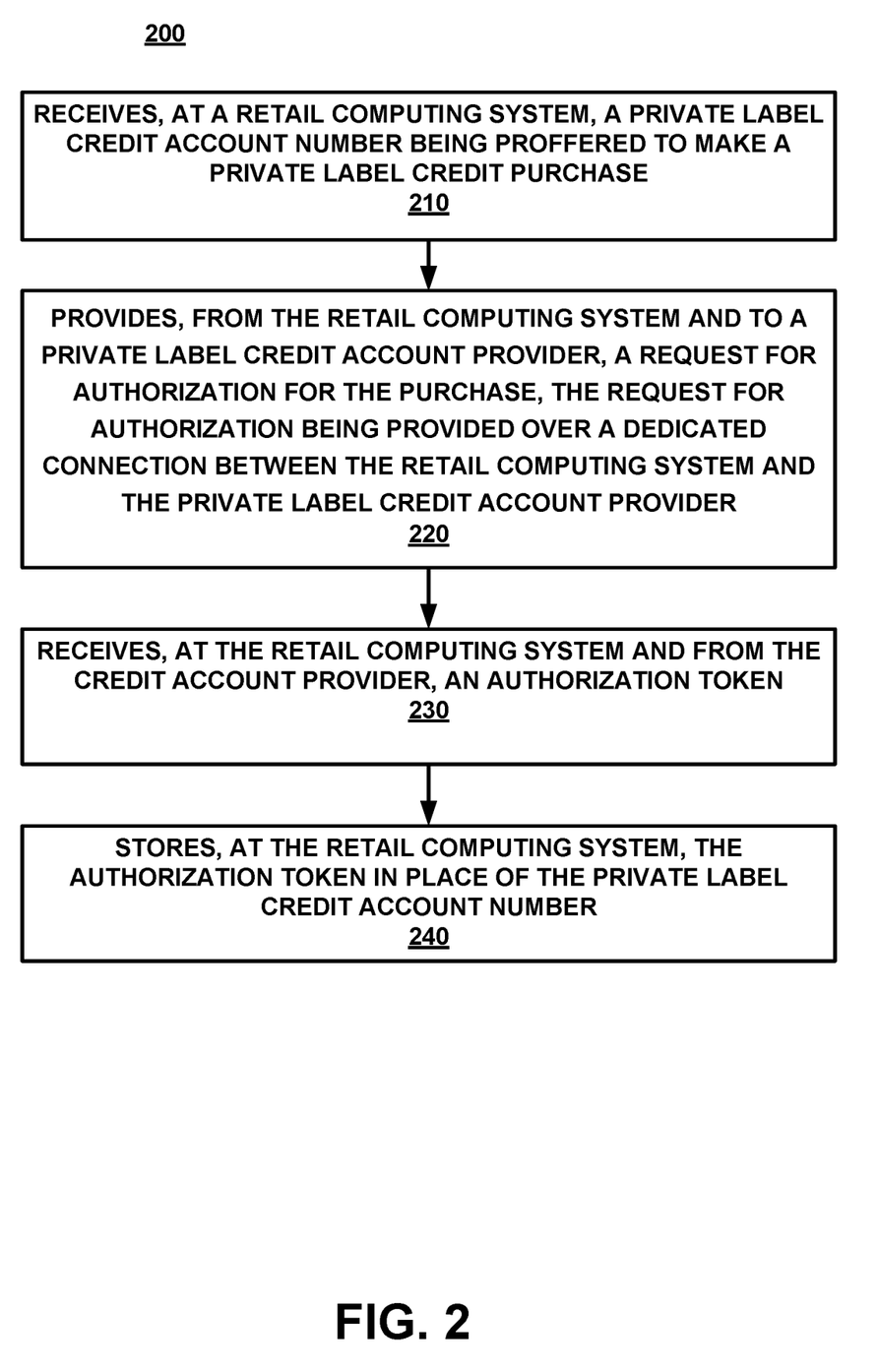
FIG. 2 depicts a flow diagram for a method for protecting a consumer's private label card number at a retailer database in accordance with an embodiment.

With reference now to FIG. 2 and to FIG. 1, a flow diagram 200 of a method for protecting a consumer's private label card number at a retailer database 118 is shown in accordance with an embodiment. With reference now to 210 of FIG. 2, one embodiment receives, at a retail computing system, a private label credit account number being proffered to make a private label credit purchase. In general, the private label credit account number may be proffered via a physical in-store interaction at a point of sale (POS), an e-commerce interaction, an account lookup interaction, an account acquisition interaction, or the like.

A physical in-store interaction at the POS can include actions such as, a physical card swipe, a physical card chip read, a scan of a display screen of a customer's mobile device, a wireless transmission of the private label credit account number from the customer's mobile device (e.g., Bluetooth transmission, near field communication (NFC), etc.), a bar code displayed on the mobile device, a UPC displayed on the mobile device, a screen shot, or the like, that can be presented by the application on the purchaser's mobile device to the retail computing system 110, visually, electronically, communicatively, or the like.

An account lookup interaction allows a customer to use the private label credit account to make a purchase when the customer is not physically able to provide the private label credit account number to the retail computing system. For example, the customer may have forgotten their credit card, mobile device for mobile payment, etc. The retailer is able to look up the customer by a customer identifier (e.g., name, address, DL number, etc.) and then allow the customer to provide some type of authorization to the private label account. For example, the customer is able to provide a log-in and password to sign in at the POS, the customer can provide a driver's license or license number that would match the number on the account, etc. Once the customer is verified, the customer is able to use the private label credit account to make a purchase at the POS.

An account acquisition interaction refers to the scenario such as when a customer applies for a credit card at the store, e.g., completes an application at the POS, when the customer is approved they can perform a purchase on that day. When this type of purchase is made, the private label credit account provider computing system 130 returns the authorization token 133 to the retail computing system 110, the authorization token 133 including an identifier that it was a token from an account acquisition interaction.

Referring now to 220 of FIG. 2 and to FIG. 1, one embodiment provides, from the retail computing system 110 and to a private label credit account provider computing system 130, a request for authorization for the purchase. In one embodiment, the request for authorization is provided over a direct communication connection 121 between the retail computing system 110 and the private label credit account provider computing system 130. In one embodiment, as shown in FIG. 1, the direct communication connection 121 ensures communications between the retail computing system 110 and the private label credit account provider computing system 130 are transmitted directly therebetween.

With reference now to 230 of FIG. 2 and to FIG. 1, one embodiment receives, at the retail computing system 110 and from the private label credit account provider computing system 130, an authorization token 133. Further detail of the authorization token 133 is provided in the discussion of FIG. 3.

With reference now to 240 of FIG. 2 and to FIG. 1, one embodiment stores, at the retailer database 118 of retail computing system 110, the authorization token in place of the private label credit account number. Additionally, the retailer will link, at retailer database 118 of the retail computing system 110, any details of the purchase, such as the goods purchased, with the stored authorization token 133. In so doing, the retail computing system 110 will be able to utilize the authorization token 133 to perform a customer return, refund, or the like.

Thus, the technology allows the credit account number to be replaced with the authorization token 133, at the retailer database 118, without a need for modifying or upgrading the POS retail computing system 110, retailer database 118, a retailer system, or the like. In other words, the entire purchase process remains the same for retail computing system 110 and for the customer except that the authorization token 133 replaces the private label credit account number at the retailer database 118.

Figure 3:
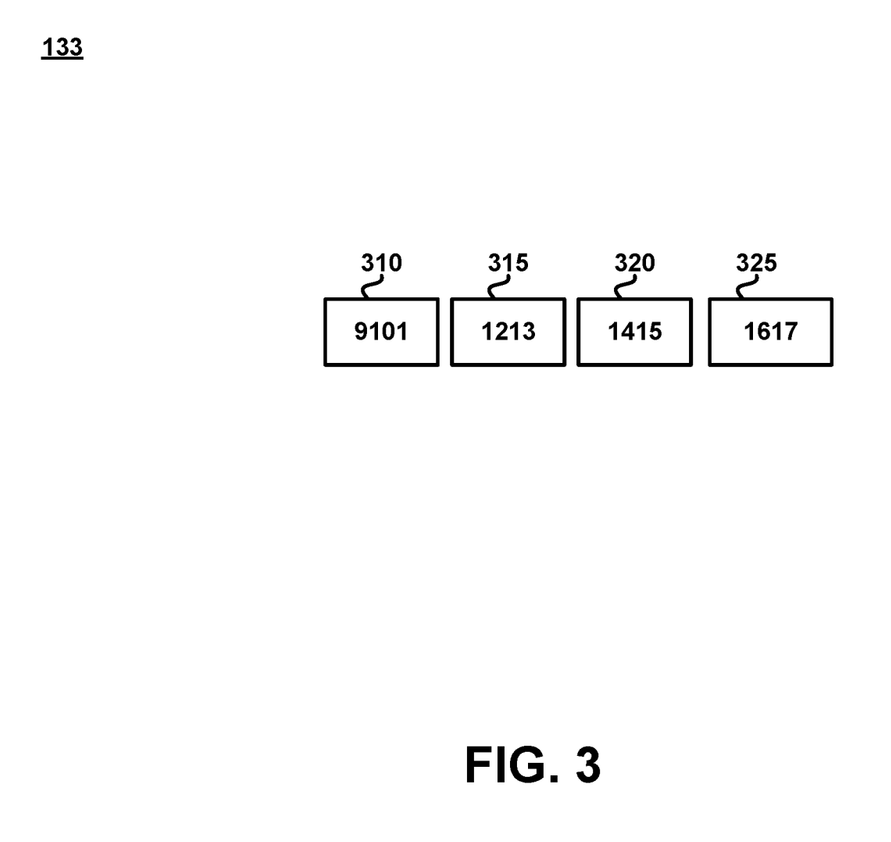
FIG. 3 depicts an embodiment of the authorization token format in accordance with an embodiment.

Referring now to FIG. 3, an example of an authorization token 133 is shown in accordance with an embodiment. In FIG. 3, authorization token 133 includes 16 digits, however, it should be appreciated that the number of digits is exemplary. The actual number of digits in authorization token 133 may be more or fewer. Moreover, the number of digits in authorization token 133 may be client specific, credit type specific, an industry standard, a local or federal code or statute, or the like. However, in one embodiment, the authorization token 133 resembles the credit card structure so that it is usable, but does not include the credit account number.

In FIG. 3, authorization token 133 includes 4 groupings 310-325, however, it should be appreciated that the number of groupings is exemplary. The actual number of groupings in authorization token 133 may be more or fewer. Moreover, the number of groupings in authorization token 133 may be client specific, credit type specific, an industry standard, a local or federal code or statute, or the like. In general, groupings 310-325 refer to different aspects of information stored in authorization token 133.

For example, in one embodiment grouping 310 is the authorization to perform a credit account transaction. In one embodiment, grouping 310 may indicate date and time or other functional aspects. In one embodiment, grouping 315 includes information about the store identifier (e.g., Store #, register #, clerk name/number, etc.). Grouping 320 includes information about the purchase amount, coupons used, discounts received, offers utilized, description of the goods purchased (e.g., manufacturer, make, model, color, size, etc.) and other aspects.

Grouping 325 includes information about the purchase such as, a physical in-store interaction at a point of sale (POS), an e-commerce interaction, an account lookup interaction, an account acquisition interaction, and the like.

By including the transaction type as a portion of the authorization token 133 a level of security is established. For example, if there is a data breach at the retailer (e.g., retail computing system 110 and/or retailer database 118) and a number of authorization tokens 133 are stolen, the transaction type portion of the authorization token 133 will deter fraudulent future use of the authorization token 133.

As such, if a token number is presented in an area that it was not initially mapped to, the authorization rules will recognize the token number as invalid and the transaction will be declined. For example, a customer makes a physical instore purchase (e.g., swipes a card), the authorization token 133 that is provided by the private label credit account provider computing system 130 will include information to indicate that the authorization token 133 is related to an instore purchase (and not an e-commerce, account look-up, or acquisition purchase).

So, if the retailer database 118 is hacked and the (card swipe) authorization token 133 is stolen, when an attempt is made to use the authorization token 133 in a different manner, (e.g., an e-commerce, account look-up, or acquisition purchase), the private label credit account provider computing system 130 would decline the use as fraudulent as the authorization token 133 was related to a physical swipe purchase.

In another example, if someone hacks a database and obtains the cache of authorization token 133 numbers from the retailer database 118, and the hacker attempts to make a counterfeit plastic card using the authorization token 133 number, the private label credit account provider computing system 130 will know that the authorization token 133 should not be part of mag stripe data on a physical piece of plastic. As such, the private label credit account provider computing system 130 will decline the fraudulent purchase because, the actual card would have the account number not the authorization token 133 number.

Similarly, if authorization token 133 is trying to be fraudulently used in the same channel, e.g., an authorization token 133 generated from an e-commerce transaction being used on a fraudulent second e-commerce purchase, the consumer would, in one embodiment, have to provide log-in credentials for authentication since it is not the actual account number, but instead the authorization token 133 that is attempting to be used for the purchase.

Thus, the technology allows a private label credit account to provide more payment security, and consumer confidence (that their account information is being protected), e.g., by replacing the card numbers with tokens that are relevant to each different transaction type, use case, and management life-cycle events.

Although one example of the groupings is discussed herein, it should be appreciated that different identifying aspects may be preset, user configurable, or a combination thereof. Moreover, the size of the groupings for authorization token 133 may be configured differently based on the amount of data needed for a given grouping.

Thus, in one embodiment, when the private label credit account provider computing system 130 provides the authorization token 133 that authorizes the purchase at the retail computing system 110, the authorization token 133 will be stored at the retailer instead of the private label credit account number. Additionally, the retailer will link, at retailer database 118 of the retail computing system 110, any details of the purchase, such as the goods purchased, with the stored authorization token 133. In so doing, the retail computing system 110 will be able to utilize the authorization token 133 to perform a customer return, refund, or the like.

In one embodiment, the private label credit account provider computing system 130 links the authorization token 133 with the private label credit account on private label credit account provider database 138. Moreover, any number of authorization tokens 133 may be linked with a single private label credit account on the database 138. Since the authorization token(s) 133 are linked with the underlying private label credit account, the private label credit account provider computing system 130 will be able to tally a plurality of metrics for every authorization token linked with the private label credit account and utilize the tally to calculate different metrics. For example, the metrics may include, rewards information for the private label credit account, customer loyalty, spending trends, offers, incentives, coupons, and the like. By maintaining the tallies for the different authorization token(s) 133 associated with the underlying private label credit account, the private label credit account provider computing system 130 can ensure that the customer receives all earned rewards, benefits, etc.

Moreover, the authorization token will be able to be used by the private label credit account provider computing system 130 to identify the transaction throughout the purchase life cycle, e.g., from authorization, through settlement all the way to billing.

In one embodiment, in addition to linking the authorization token(s) 133 to the private label credit account, in the field of lifecycle management another account can be linked to the prior account and any authorization tokens associated therewith. For example, if a customer needs a replacement card, the replacement card account number can be mapped to the old account number. Thus, the customer's previously earned rewards, and the like will be linked to the new account without requiring significant data transfer, database duplication, and the like.

Example Computer System Environment

Figure 4:
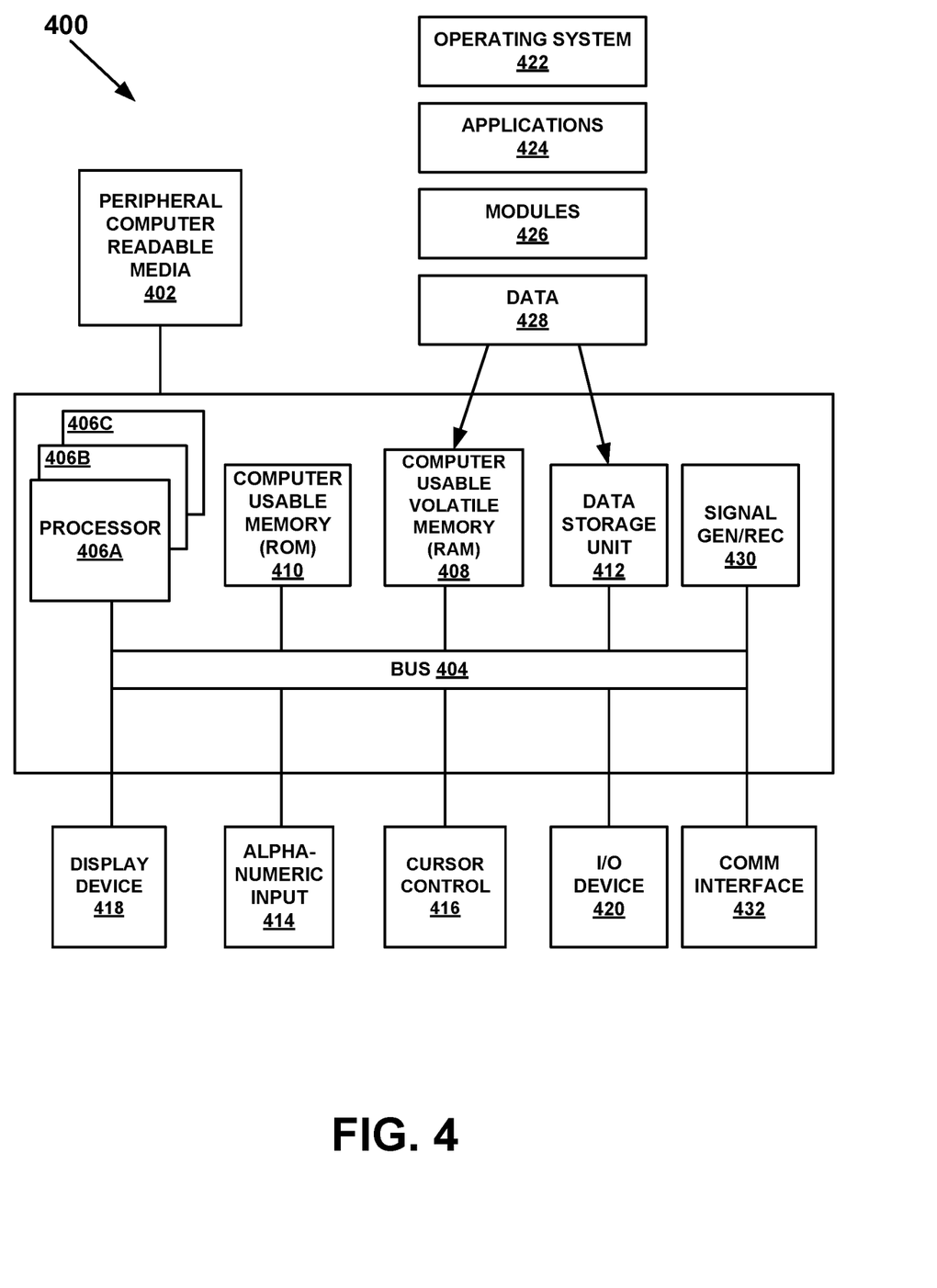
FIG. 4 is a block diagram of an example computer system with which or upon which various embodiments of the present invention may be implemented.

With reference now to FIG. 4, portions of the technology for providing a communication composed of computer-readable and computer-executable instructions that reside, for example, in non-transitory computer-readable medium for storing instructions of a computer system. That is, FIG. 4 illustrates one example of a type of computer that can be used to implement embodiments of the present technology. FIG. 4 represents a system or components that may be used in conjunction with aspects of the present technology. In one embodiment, some or all of the components described herein may be combined with some or all of the components of FIG. 4 to practice the present technology.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 4, computer system 400 of FIG. 4 is well adapted to having peripheral computer readable media 402 such as, for example, an external hard drive, a compact disc, a flash drive, a thumb drive, a wireless radio enabled device, and the like coupled thereto.

Computer system 400 of FIG. 4 includes an address/data/control bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic disk drive, optical disk drive, solid state drive (SSD), and the like) coupled to bus 404 for storing information and instructions. Computer system 400 also includes an optional alpha-numeric input device 414 including alphanumeric and function keys coupled to bus 404 for communicating information and command selections to processor 406A or processors 406A, 406B, and 406C. Computer system 400 also includes an optional cursor control device 416 coupled to bus 404 for communicating user input information and command selections to processor 406A or processors 406A, 406B, and 406C. Optional cursor control device may be a touch sensor, gesture recognition device, and the like. Computer system 400 of the present embodiment also includes an optional display device 418 coupled to bus 404 for displaying information.

Referring still to FIG. 4, optional display device 418 of FIG. 4 may be a liquid crystal device, cathode ray tube, OLED, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 also includes an I/O device 420 for coupling system 400 with external entities. For example, in one embodiment, I/O device 420 is a modem for enabling wired or wireless communications between system 400 and an external network such as, but not limited to, the Internet or intranet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple system 400 with another device, such as a mobile telephone, radio, or computer system.

The computing system 400 is only one example of a suitable computing environment and is not intended to suggest any limitation as to the scope of use or functionality of the present technology. Neither should the computing environment be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for protecting a consumer's private label card number at a retailer database, said method comprising:
   receiving, at a retail computing system, a private label credit account number;
   generating, at said retail computing system, a purchase request, said purchase request comprising:
      requesting authorization for said private label credit account number; and
      indicating how said private label credit account number was presented to said retail computing system, said indicating comprising a channel and a device;
   providing, from said retail computing system, said purchase request to a private label credit account provider computing system;
   generating, at said private label credit account provider computing system, an authorization token, said authorization token not including said private label credit account number, said authorization token comprising a token limited scope, said token limited scope:
      identifying said channel and said device, and
      restricting said token usage to only said channel and said device such that an attempt to utilize said authorization token in a manner inconsistent with said channel and said device will be declined;
   providing, from said private label credit account provider computing system, said authorization token to said retail computing system;
   receiving, at said retail computing system, said authorization token from said private label credit account provider computing system;
   replacing, at said retail computing system, said private label credit account number with said authorization token;
   storing, at said retail computing system, said authorization token;
   not storing, at said retail computing system, said private label credit account number;
   linking, at said retail computing system, a detail of a goods purchased with said stored authorization token; and
   performing, at said retail computing system, a return utilizing said stored authorization token stored at said retail computing system in conjunction with said detail of said goods purchased linked with said stored authorization token without requiring said private label credit account number.

2. The method of claim 1, further comprising:
   linking, at a database of said private label credit account provider computing system, said authorization token with said private label credit account number.

3. The method of claim 2, further comprising:
   tallying, at said database of said private label credit account provider computing system, a plurality of metrics for every authorization token linked with said private label credit account number.

4. The method of claim 3, further comprising:
   calculating a rewards information for said private label credit account number utilizing a result of said tallying of one or more of said plurality of metrics for every authorization token linked with said private label credit account number.

5. The method of claim 1, further comprising:
   receiving said private label credit account number at said retail computing system during a physical in-store interaction;
   said purchase request comprising:
      an indication that said private label credit account number was received at said retail computing system during said physical in-store interaction.

6. The method of claim 5, wherein said physical in-store interaction is selected from a group consisting of: a physical card swipe, a physical card chip read, a scan of a display screen of a customer's mobile device, and a wireless transmission of said private label credit account number from said customer's mobile device.

7. The method of claim 1, further comprising:
receiving said private label credit account number at said retail computing system during an e-commerce interaction;
said purchase request comprising:
 an indication that said private label credit account number was received at said retail computing system during said e-commerce interaction.

8. A system comprising:
a retail computing system, said retail computing system comprising:
 a retail database; and
 a retail processor, said retail processor configured to:
  receive a private label credit account number;
  generate a purchase request, said purchase request comprising:
   a request for authorization for said private label credit account number; and
   an indicator identifying how said private label credit account number was presented to said retail computing system, said indicator comprising a channel and a device; and
  provide said purchase request to a private label credit account provider computing system;
said private label credit account provider computing system, said retail computing system comprising:
 a private label credit account provider processor, said private label credit account provider processor configured to:
  generate an authorization token linked to said private label credit account number, said authorization token not including said private label credit account number, said authorization token comprising a token limited scope, said token limited scope:
   identifying said channel and said device, and
   restricting said token usage to only said channel and said device such that an attempt to utilize said authorization token in a manner inconsistent with said channel and said device will be declined; and
  provide said authorization token to said retail computing system;
said retail processor of said retail computing system configured to:
 receive said authorization token from said private label credit account provider computing system;
 replace, at said retail database, said private label credit account number with said authorization token;
 store, at said retail database, said authorization token;
 not store, at said retail database, said private label credit account number;
 link, at said retail database, a detail of a goods purchased with said stored authorization token; and
 utilize said stored authorization token stored at said retail database to perform a customer refund system in conjunction with said detail of said goods purchased linked with said stored authorization token without requiring said private label credit account number.

9. The system of claim 8, wherein said private label credit account provider computing system is further configured to:
 tally a plurality of metrics for every authorization token linked with said private label credit account number; and
 calculate a rewards information for said private label credit account number from a result of said tally.

10. The system of claim 8, wherein said channel is selected from a group consisting of: a physical in-store interaction at a point of sale (POS), and an e-commerce interaction.

11. The system of claim 10, wherein said physical in-store interaction at said POS is selected from a group consisting of: a physical card swipe, a physical card chip read, a scan of a display screen of a customer's mobile device, and a wireless transmission of said private label credit account number from said customer's mobile device.

* * * * *